(12) United States Patent
Post et al.

(10) Patent No.: US 8,590,377 B2
(45) Date of Patent: Nov. 26, 2013

(54) INERTIAL MEASUREMENT UNIT

(75) Inventors: Ernest Post, Cambridge, MA (US); Neil Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 301 days.

(21) Appl. No.: 13/023,537

(22) Filed: Feb. 8, 2011

(65) Prior Publication Data

US 2011/0192227 A1 Aug. 11, 2011

Related U.S. Application Data

(60) Provisional application No. 61/302,501, filed on Feb. 8, 2010.

(51) Int. Cl.
*G01C 19/56* (2012.01)
(52) U.S. Cl.
USPC .................. 73/504.04; 73/504.15; 73/514.32
(58) Field of Classification Search
USPC ............... 73/504.04, 504.12, 504.15, 514.32
See application file for complete search history.

(56) References Cited

U.S. PATENT DOCUMENTS

| | | | | |
|---|---|---|---|---|
| 5,461,916 | A | * 10/1995 | Fujii et al. | 73/514.32 |
| 5,691,471 | A | * 11/1997 | Okazaki et al. | 73/504.04 |
| 6,158,280 | A | * 12/2000 | Nonomura et al. | 73/504.04 |
| 7,107,842 | B2 | 9/2006 | Wu et al. | |

OTHER PUBLICATIONS

Alexander, R., Antennae as Gyroscopes, Science, vol. 315, pp. 771-772, Feb. 9, 2007.
Chen, Y. Wicaksono, D., Pakula, L. Rajaraman, V., French, P., Modelling, Design and Fabrication of a Bio-Inspired MEMS Vibratory Gyroscope, in Proceedings of Semiconductor Advances in for Future Electronics (SAFE) 2007, pp. 572-576, Veldhoven, The Netherlands, Nov. 29-30, 2007.
Fox, J., Fairhall, A., Daniel, T., Encoding properties of haltere neurons enable motion feature detection in a biological gyroscope. Proceedings of the National Academy of Sciences, vol. 107, issue 8, pp. 3840-3845, Feb. 2010.
Hengstenberg, R., Controlling the fly's gyroscopes. Nature, vol. 392, pp. 757-758, Apr. 1998.
Wicaksono, D., Chen, Y., French, P., Design and Modelling of a Bio-Inspired MEMS Gyroscope. Proceedings of the International Conference on Electrical Engineering and Informatics 2007, pp. 226-229, Bandung, Indonesia, Jun. 2007.
Wu, W., Wood, R., Fearing, R., Halteres for the Micromechanical Flying Insect. Proceedings of IEEE International Conference on Robotics and Automation, 2002, ICRA '02, vol. 1, pp. 60-65.

* cited by examiner

*Primary Examiner* — John Chapman, Jr.
(74) *Attorney, Agent, or Firm* — Stephen R. Otis

(57) ABSTRACT

In exemplary embodiments of this invention, an inertial measurement unit (IMU) includes a cantilevered proof mass and electrostatic drive. The electrostatic drive puts the proof mass into a controlled trajectory in which it oscillates rapidly, for example, by vibrating back and forth in a plane or traveling in a circular or elliptical orbit. The IMU detects lateral or angular acceleration of the IMU, by measuring the perturbations of the proof mass trajectory from the expected motion in a fixed, non-rotating inertial frame. In exemplary embodiments of this invention, the proof mass position and motion are measured by methods of differential potential measurement (with constant slope voltage), differential displacement current measurement, or phase-sensitive or synchronous detection of motion.

15 Claims, 12 Drawing Sheets

INERTIAL MEASUREMENT UNIT

RELATED APPLICATIONS

This application claims the benefit of U.S. Provisional Application Ser. No. 61/302,501, filed Feb. 8, 2010, the entire disclosure of which is herein incorporated by reference.

STATEMENT REGARDING FEDERALLY SPONSORED RESEARCH OR DEVELOPMENT

This invention was made with U.S. government support under Grant Number W911NF-08-1-0254, awarded by DARPA (the Defense Advanced Research Projects Agent). The government has certain rights in this invention.

FIELD OF THE TECHNOLOGY

The present invention relates generally to instrumentation for inertial measurement.

SUMMARY

In exemplary embodiments of this invention, an inertial measurement unit (IMU) measures both lateral and angular acceleration. The IMU includes a cantilevered proof mass, and an electrostatic drive that puts the proof mass into a controlled trajectory in which it oscillates rapidly, for example, by vibrating back and forth in a plane or traveling in a circular or elliptical orbit. Lateral or angular acceleration of the IMU affects the trajectory of the proof mass as it oscillates. The IMU detects lateral or angular acceleration of the IMU, by measuring the perturbations of the proof mass trajectory from the expected motion in a fixed, non-rotating inertial frame.

The cantilevered proof mass is, in some implementations, similar in shape to a haltere. A haltere is a club-shaped organ of some flies that oscillates rapidly in flight and acts as a gyroscopic sense organ.

In exemplary embodiments of this invention, the motion of the proof mass is measured by capacitive pickup. Transmit-receive capacitive measurements are used, in which signals transmitted by one or more electrodes are received by the proof mass, which acts as a receiving terminal.

This invention may be implemented with a variety of different transmit-receive capacitive sensing techniques, such as (1) a novel approach of differential displacement current measurement with constant slope voltage, (2) a novel approach of differential potential measurement, (3) a novel approach of synchronous detection for phase-sensitive detection of motion, (4) step-function sensing, or (5) or frequency-division multiplexing Differential displacement current measurement (with constant slope voltage) results in an unexpected and dramatic increase in sensitivity of capacitive sensing (with theoretical sensitivity in the femto-Farad range).

Microcontroller firmware is used for the electrostatic particle drive, readout and control.

In exemplary implementations of this invention, the IMU comprises a millimeter-scale electromechanical device.

This invention has many practical applications. For example, in some implementations, the IMU may be used as an accelerometer to detect sudden, lateral deceleration of a vehicle, and thus may serve as a trigger for deployment of air bags in cars. Other applications of this invention include personal electronic devices that sense motion and gesture, and instrumentation for motion capture in general.

An advantage of this invention is its small size and low cost.

It is helpful to compare this invention to two items of prior art. First, Wu et al. (U.S. Pat. No. 7,017,842) describes a haltere-like gyroscope, where the beating of the haltere is driven by piezoelectric benders and the motion of the haltere is measured by resistive strain gauges. Wu mentions in passing that haltere motion may be detected by other types of sensors, including capacitive sensors, without further detail on capacitive sensing.

Second, Y. Chen proposes a haltere gyroscope, in which the proof mass is a thick layer of membrane, electrodes beneath the membrane drive the vibration of the proof mass electrostatically, and the motion of the proof mass is measured by a piezoresistive sensing method. [Y. Chen et al., Modeling, Design, and Fabrication of a Bio-inspired MEMS Vibratory Gyroscope, Proc. of Semiconductor Advances in for Future Electronics (SAFE) 2007, pp. 572-576, Veldhoven, The Netherlands, 2007].

A gyroscope measures changes in rotational attributes, such as pitch, roll or yaw. Both the Wu patent and this Chen paper contemplate using a vibrating haltere as a gyroscope to measuring such changes in rotational attributes.

However, they do not disclose using a vibrating proof mass as an accelerometer to measure lateral acceleration of an IMU, as the present invention does. Nor do they teach capacitive readout of proof mass position and motion by methods of differential potential measurement, differential displacement current measurement, and phase-sensitive or synchronous detection of motion, as described below. Nor do they teach many other features included in exemplary implementations of this invention.

The above Figures illustrate some illustrative implementations of this invention, or provide information that relates to those implementations. However, this invention may be implemented in many other ways. The above Figures do not show all of the details of this invention.

DETAILED DESCRIPTION

In illustrative implementations of this invention, an IMU measures both lateral and angular acceleration. In this IMU, a cantilevered proof mass is put into a controlled trajectory by an electrostatic particle drive. The motion of the proof mass is measured by capacitive pickup. Lateral acceleration of the IMU (as well as rotation of the IMU) is determined by measuring the perturbations of the proof mass trajectory from the expected motion in a fixed, non-rotating inertial frame. Microcontroller firmware is used for the electrostatic particle drive, readout and control.

Figure 1:
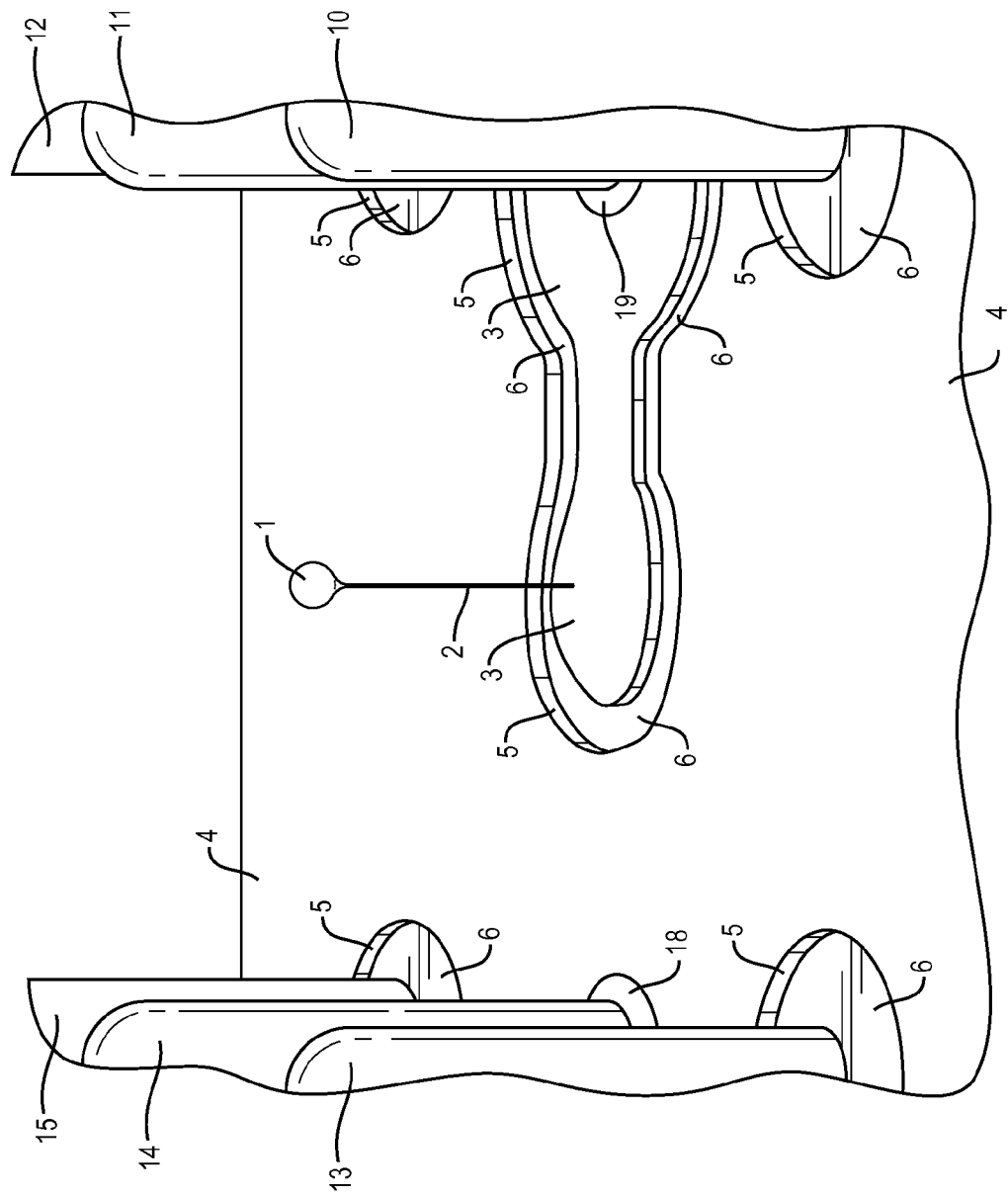
FIG. 1 shows a cantilevered proof mass mounted on an electrode.
Figure 2:
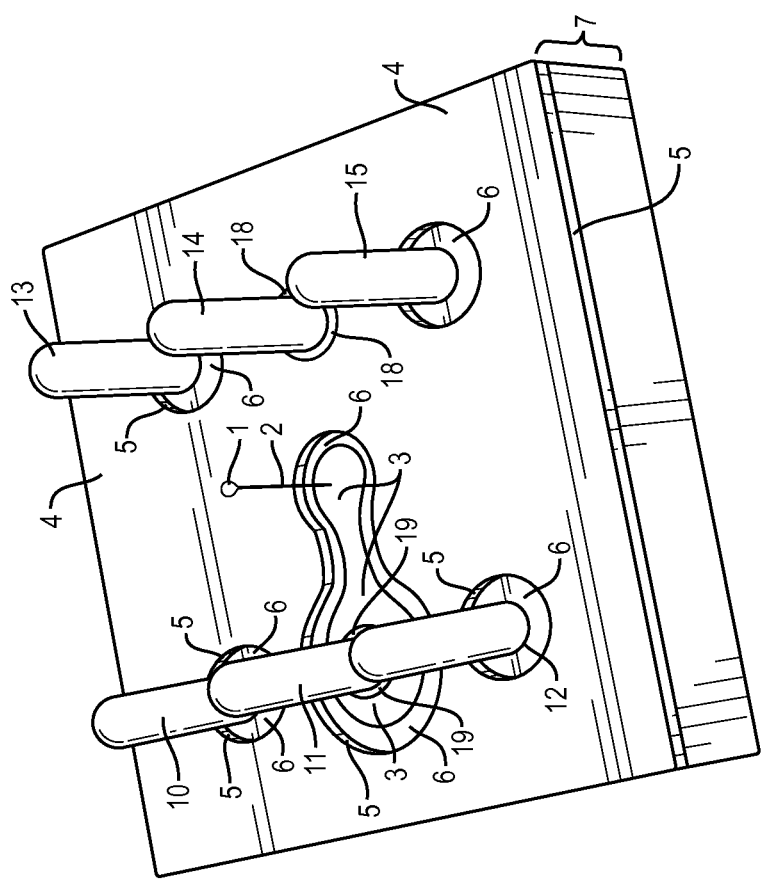
FIG. 2 shows the same proof mass, from a different angle.
Figure 3:
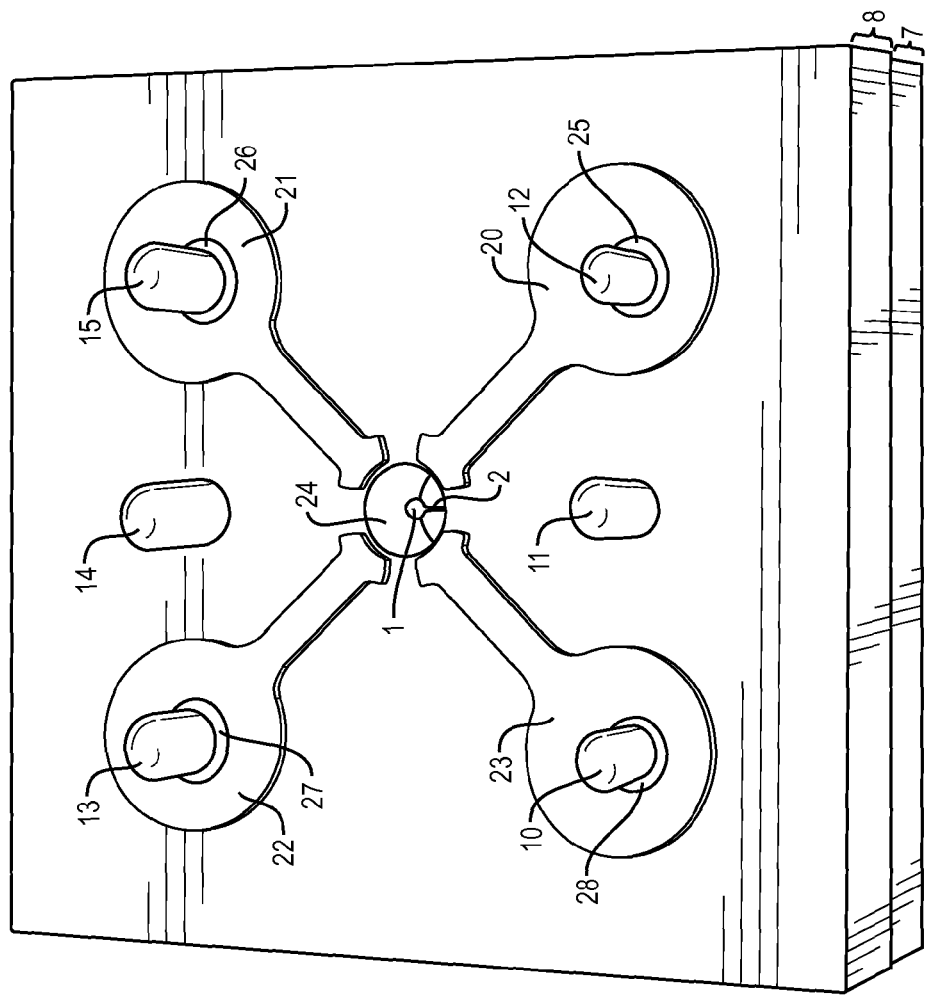
FIG. 3 shows a lower electrode stage on which a cantilevered proof mass is mounted, and an upper electrode stage used to actuate motion and measure position of the proof mass."

FIGS. 1 to 3 show a working prototype of this invention.

As shown in FIG. 1, a conductive proof mass 1 is attached to one end of a conductive beam 2. Conductive beam 2 is rigid. As used herein, "rigid" means sufficiently rigid to support the weight of the proof mass 1, but flexible enough to bend as the proof mass oscillates (e.g., as the proof mass vibrates back and forth in a single plane or orbits in a circular or elliptical trajectory).

Being conductive, proof mass 1 and beam 2 also form an electrostatic probe of the electric field, particularly in the vicinity of proof mass 1. The other end of beam 2 is attached to a pickup electrode 3, which is isolated from a surrounding shield electrode 4. These electrodes have some thickness 5, and are formed on and attached to a non-conductive substrate 6. The electrodes and substrate may together comprise a printed circuit board 7. Typically the electrode material may be copper and the substrate material may be an epoxy-filled fiberglass or other mechanically stable, rigid dielectric. Electrode 3 is connected to conductive post 11 by a conductive attachment 19 such as a solder joint. Similarly, post 14 is connected to the shield electrode 4 by conductive attachment 18. Posts 10, 12, 13, and 15 pass through printed circuit board (PCB) 7 without connecting electrically to any of its elements.

The proof mass 1 comprises a 200 μm stainless steel bead. The bead is attached to conductive beam 2, which beam is a fine metal wire 1.5 mm long and 10 μm in diameter. The proof mass 1 was formed by melting the end of the beam 2 fine metal wire. The rest of the wire comprises the conductive beam 2. Together, the proof mass 1 and conductive beam 2 comprise a cantilevered proof mass.

FIG. 2 shows the same configuration as FIG. 1, from a different angle. The lateral dimensions of PCB 7 are 1 cm×1 cm.

In FIG. 3, a second PCB 8 has been stacked on top of PCB 7. This PCB has a set of four electrodes 20-23 arranged around a cavity 24 cut into the substrate of PCB 8. The proof mass 1 and cantilever 2 are free to move in cavity 24. Posts 11 and 14 make no electrical contacts on PCB 8. Posts 10, 12, 13, 15 are electrically and mechanically secured to electrodes 23, 20, 22, 21 respectively by conductive attachments 28, 25, 27, 26 respectively. The proof mass 1 and cantilever 2 are free to move in cavity 24 which is cut into the substrate of PCB 8.

In some implementations, electrodes 20, 21, 22, 23 are employed alternately for electrostatic drive (to drive the motion of the proof mass) or for capacitive sensing. Or some of these electrodes (e.g., 20, 22) may be used for electrostatic drive of the motion of the proof mass and others (e.g., 21, 23) may be used for capacitive sensing.

Figure 4:
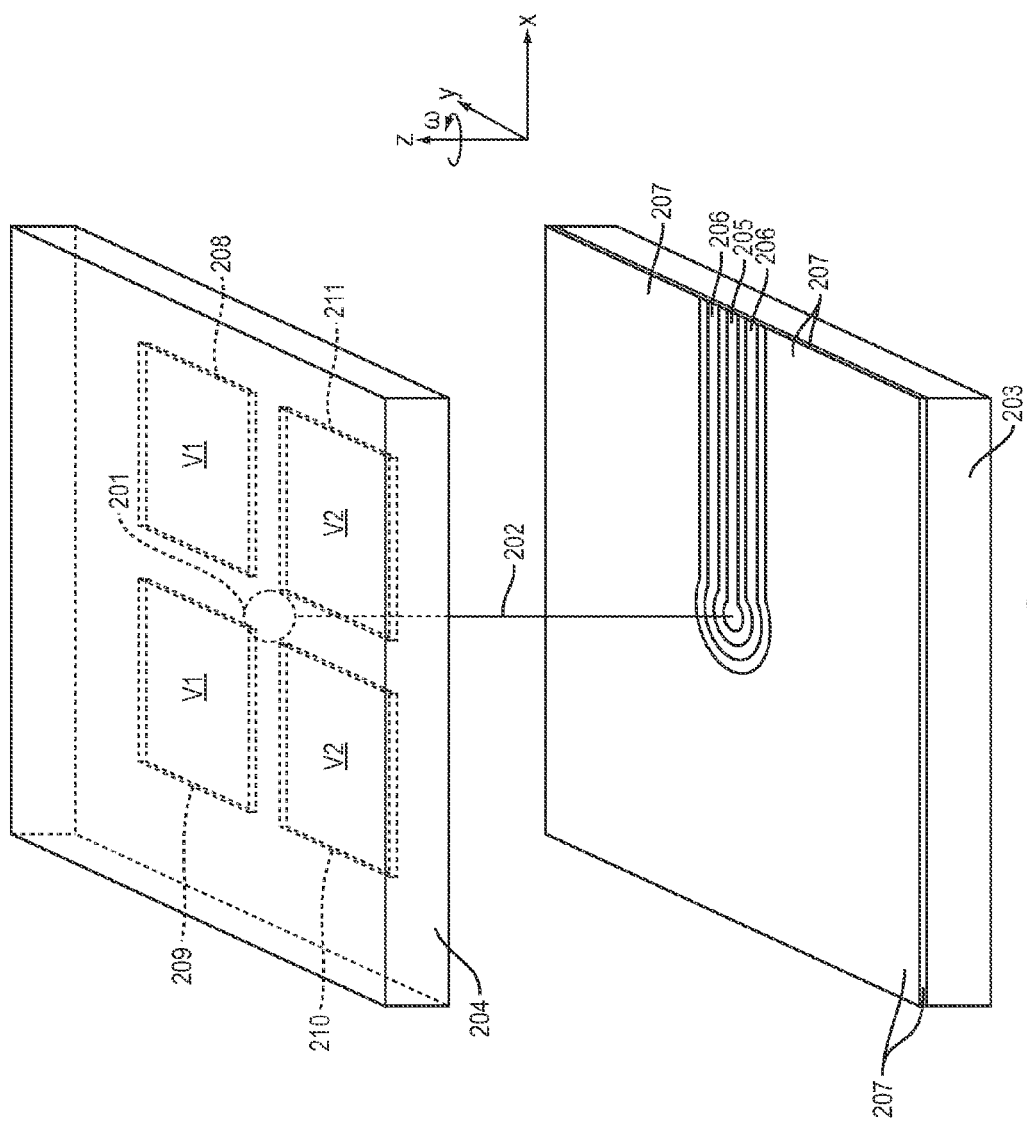
FIG. 4 shows an oblique projection of an IMU configuration in which electrostatic drive electrodes are above the proof mass.

FIG. 4 depicts another embodiment of this invention. Proof mass 201 and cantilever 202 are mounted on probe electrode 205. Electrode 206 is an actively-driven shield electrode that reduces the effective capacitance of electrode 205 with respect to the surrounding shielding electrode 207, which is typically connected to an electrical ground or other common reference. Electrodes 205, 206, 207 are patterned on a substrate 203.

Another set of electrodes 208, 209, 210, 211 are patterned around the perimeter of a hole cut into substrate 204. This substrate is displaced parallel to substrate 203 such that the electrodes are approximately coplanar with proof mass 201, which is free to move within the hole.

As was the case in FIG. 3, electrodes 208, 209, 210, 211 may be employed alternately for electrostatic drive and for capacitive sensing. Or some of these electrodes (e.g., 208, 210) may be used for electrostatic drive and others (e.g., 209, 211) for capacitive sensing.

Figure 5:
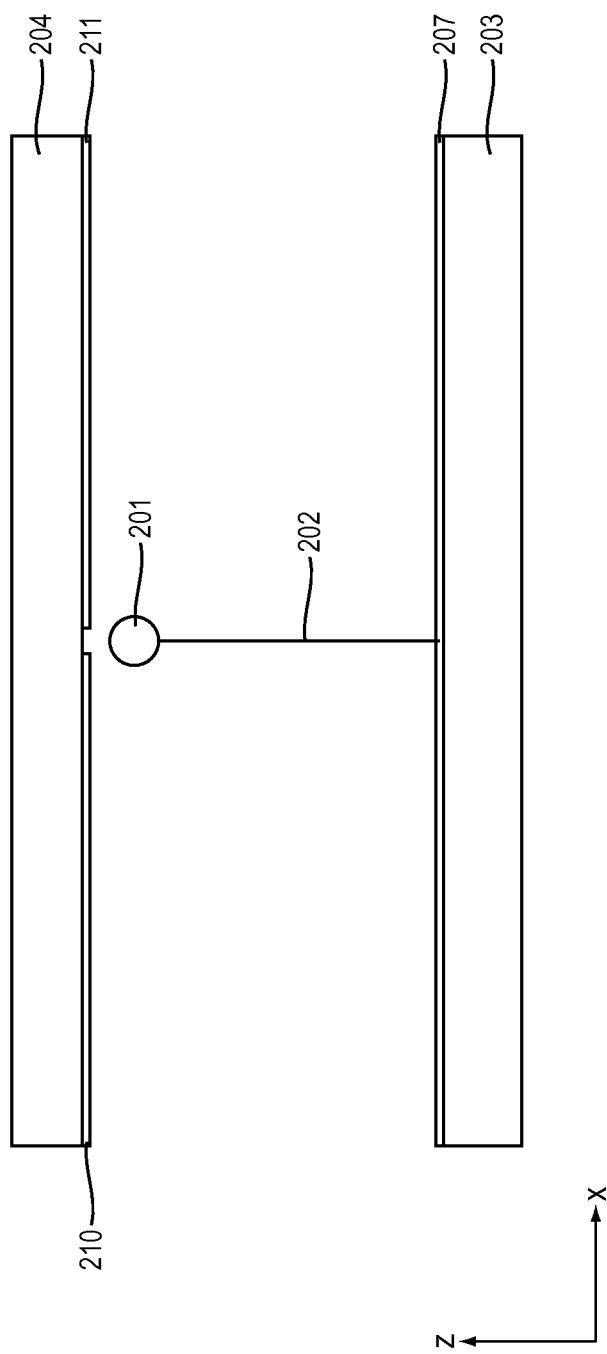
FIG. 5 is a schematic front view of the same configuration as FIG. 4.

FIG. 5 is a front view of the configuration shown in FIG. 5. It illustrates the clearance between proof mass 201 and electrodes 210, 211. The exact clearance is a parameter chosen by the designer: decreasing it increases capacitive coupling, but also increases the possibility of corona discharge from the electrodes or mechanical interference if the cantilever length increases due to tensile stress or thermal expansion.

Figure 6A:
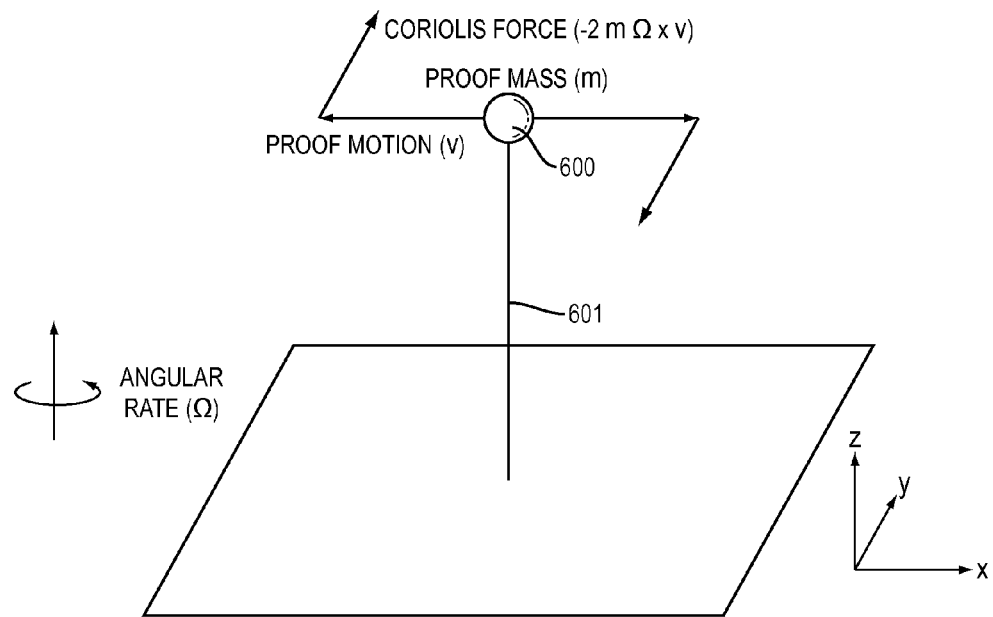
FIG. 6 is a schematic depiction of two proof mass trajectories.

FIG. 6A shows a proof mass trajectory in which the proof mass is actuated along the x axis. Application of an angular rate Ω to the IMU will displace the proof mass along the y axis due to a Coriolis force. This displacement is measured to obtain an estimate of angular rate.

For example, in a prototype of this invention, the proof mass resonates at anywhere from 200 to 600 Hz in a plane perpendicular to the support plane. When the support plane is rotated about the axis of the beam (at rest), the vibrating proof mass experiences a Coriolis force that tends to keep the plane of vibration fixed with respect to a fixed inertial frame. In the frame of reference of the support plane, the plane of vibration appears to rotate exactly counter to the rotation applied to the support plane. Furthermore, lateral accelerations applied to the IMU will displace the center of the proof mass's resonant motion.

Figure 6B:
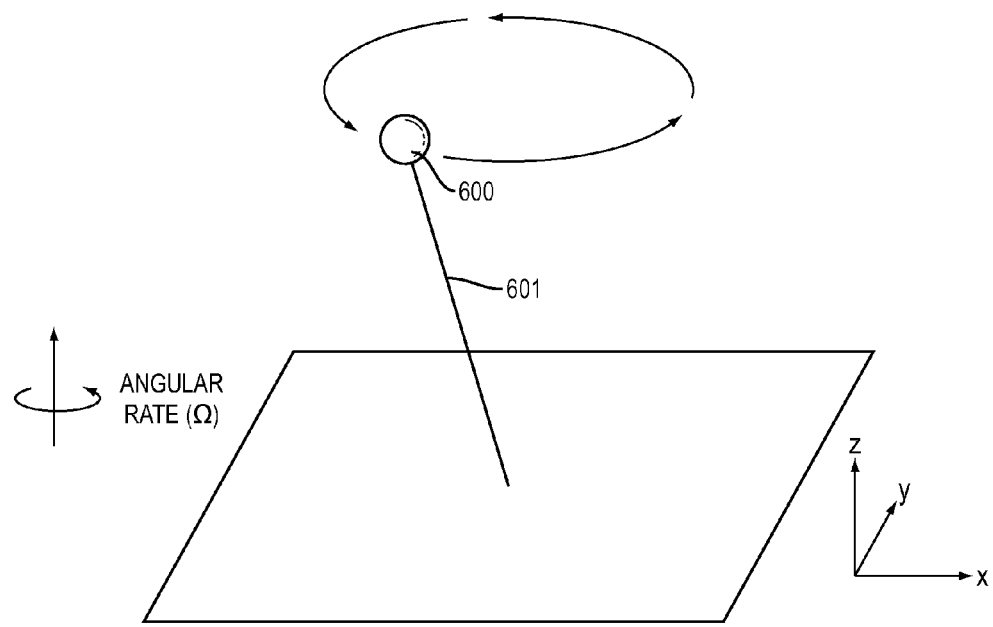

In FIG. 6B, the proof mass is driven to move in a circular or elliptical trajectory in the xy plane. Application of an angular rate to rate Ω to the IMU will advance or retard the orbital angle phase of the proof mass, which is measured in the apparatus frame to obtain an estimate of angular rate. The imposition of a circular or other orbit also enables measurement of lateral displacements of the orbital center of motion, and therefore measurement of accelerations in the xy plane. Again, lateral accelerations applied to the IMU will displace the center of the proof mass's resonant orbital motion.

In other embodiments, the proof mass is driven to move in more complex patterns, e.g., by exciting resonant motion at integer multiples of the fundamental resonant frequencies $n\omega_x$ and $n\omega_y$ along each axis. As an example, in one embodiment the cantilever has a circular cross section and therefore $\omega_x=\omega_y=\omega$, while the proof mass is driven at $3\omega$ along one axis and $5\omega$ another axis to provide frequency-division multiplexing of readout of motion in each axis.

In an alternate embodiment, element 2 shown in FIGS. 1 to 3 comprises a flexible tether rather than a rigid conductive beam. As used herein, "flexible" means that the tether is so flexible that it is not able to support the support the weight of the proof mass.

In this alternate embodiment, a time-varying voltage pattern applied to electrodes 20-23 electrodynamically suspends the proof mass and the charge on the proof mass may be sensed or controlled by means of the electrical connection through elements 2 and 3. In this case the electrode structure is a form of particle trap, and methods such as those described in U.S. Pat. No. 7,755,765 (the entire disclosure of which is incorporated by reference herein) may be employed to suspend and measure the motion of the proof mass.

The proof mass 1 may have a shape other than a sphere. For example, the proof mass 1 may instead take the form of a cylinder of metal or other material deposited on the end of cantilever 2.

Also note that while FIG. 3 depicts four electrodes 20-23 and FIG. 4 depicts four electrodes 208-211, any number of electrodes (from one to many) may be employed to actuate and/or probe the proof mass motion or position.

An x, y, z coordinate system may be used when describing this invention. Each of the three axes (x, y, z) are perpendicular to the other two axes. The z axis is vertical, and the x axis and y axis define a horizontal plane. In illustrative implementations, this invention measures not only yaw rate, (i.e. the angular rate $\Omega$ of rotation about the vertical z axis) but also accelerations along the x and y axes of the horizontal xy plane. For example, the z axis may be a vertical line that intersects the point at which the conductive beam 202 joins the pickup electrode 205.

In illustrative embodiments of this invention, lateral acceleration of the IMU in the xy plane (as well as rotation or yaw rate $\Omega$ of the IMU about its vertical axis z) may be determined by measuring the perturbations of the proof mass trajectory from the expected motion in a fixed, non-rotating inertial frame.

In illustrative embodiments of this invention, capacitive sensing is employed to measure the position of the proof mass with respect to its proximal electrodes, which are fixed with respect to the apparatus. The capacitive coupling between any two given terminals varies approximately inversely with the distance between the terminals. Precise position estimates may be obtained from multiple capacitive coupling measurements.

This invention may be implemented with a variety of different capacitive sensing techniques, such as (1) a novel approach of differential displacement current measurement with constant slope voltage, (2) a novel approach of differential potential measurement, (3) a novel approach of synchronous detection for phase-sensitive detection of motion, (4) step-function sensing, or (5) or frequency-division multiplexing Preferably, the proof mass capacitive coupling is determined by using differential displacement current measurement: Consider the arrangement of FIG. 4. Suppose that proof mass 201 has been actuated into resonant motion in the xz plane (i.e. y=0). Now apply voltage $V1(t)=Vb1+m\,t$ to electrodes 208, 209 and voltage $V2(t)=Vb2-m\,t$ to electrodes 210, 211, where m is a constant slope of the voltage (i.e., the voltage is changing at a constant rate). The displacement current induced in the proof mass will be approximately $I(t)=C1(t)\,dV1/dt+C2(t)\,dV2/dt=m\,(C1(t)-C2(t))$, where $C1(t)$ is the capacitance between the proof mass and electrodes 208, 209 and $C2(t)$ is the capacitance between the proof mass and electrodes 210, 211. In other words, the current I(t) is a measurement of the differential capacitive coupling to the pairs of driven electrodes. By symmetry, C1 and C2 will be equal anywhere on the y=0 plane, so the displacement current will be 0. If the proof mass moves off the y=0 centerline, displacement current I(t) provides a sensitive, signed measurement of the spatial displacement of the proof mass.

From the definition of capacitance it is known that $Q=CV$ (where Q is charge, C is capacitance and V is voltage). The first derivative of this equation with respect to time is $I=C\,dV/dt$ (assuming C is fixed).

In a prototype of this invention, the high-voltage actuation amplifiers have an output slew rate of approximately $10^6$ V/s and the haltere readout amplifier is sensitive to displacement currents on the order of $10^{-9}$ A. Therefore, in this prototype, the differential displacement current measurement has a theoretical sensitivity to capacitance on the order of $C=I/(dV/dt)=10^{-15}$ F or 1 fF. In practice, this sensitivity is limited to some extent by parasitic capacitances. However, active shielding may be employed to reduce total parasitics.

In another embodiment, the capacitive readout is implemented with differential potential measurement: Consider the arrangement of FIG. 4. Suppose that proof mass 201 has been actuated into resonant motion in the xz plane (i.e. y=0). Now apply voltage +V to electrodes 208, 209 and voltage −V to electrodes 210, 211. By symmetry, the potential anywhere on the y=0 plane will be (+V+−V)=0, and the proof mass will probe the spatially varying potential in the space surrounding the electrode. If the proof mass moves toward the positive electrodes, the voltage measured on the proof mass will increase; if it moves toward the negative electrodes, its voltage will decrease.

In another embodiment, estimates of proof mass position are obtained using synchronous detection. For example, the proof mass is driven into a circular orbit by a time-varying electric field generated by driving electrodes 20-23 in FIG. 3 or electrodes 208-211 in FIG. 4. The unperturbed motion of the proof mass will be known with respect to the phase of the time-varying field. By temporarily substituting the driving field pattern with a probe field pattern and measuring the potential or induced charge on the proof mass (1 or 201), the proof mass position may be determined. For example, if electrodes 208 and 209 in FIG. 4 are set to voltages +V and −V respectively, then as the proof mass passes underneath the electrodes in transit from one to the other it will move through a potential field that varies from positive to negative, and will cross zero potential (+V+−V=0) at the plane of symmetry between the electrodes.

Synchronous detection may be implemented for phase-sensitive detection of motion: Suppose the proof mass 201 is moving in a circular path underneath the electrodes 208-211. Suppose that electrodes 208 and 210 are set to voltage −V, while electrodes 209 and 211 are set to voltage +V. As the proof mass crosses the centerline between electrode pairs, positive or negative currents will be induced in the proof mass. The relative timing of these induced currents gives a reading of lateral displacement. If the proof mass orbit is concentric with the electrode array, the induced currents will occur at regularly-spaced times. Now suppose that the proof mass moves in a counterclockwise circular orbit that is displaced in the positive x direction. The timing of induced current as the proof mass orbit crosses y=0 will be as before, at regular intervals. However, the timing of induced current as the proof mass orbit crosses x=0 will be altered because the orbit takes less time to traverse the x<0 region than it takes to cross the x>0 region. The difference of these times is a signed measurement of the orbital displacement. Furthermore, the same measurement technique will simultaneously and independently determine orbital displacement along the y axis. Finally, a coordinated shift of the timing of all induced currents provides a measurement of changes in the orbital phase which correspond to rotation of the apparatus about the orbital rotation axis. In other words, this last measurement provides an estimate of whole-angle rotation rather than angular rate.

In another embodiment, the capacitive coupling is determined by step-function measurement of capacitive coupling. In this case, the capacitive coupling between an electrode and the proof mass may be measured by presenting a step function on either terminal (i.e. electrode or proof mass) and reading out the displacement current induced at the other terminal.

Alternately, frequency-division multiplexing may be used for the capacitive readout. This approach may be combined with others, such as the step-function approach.

There are many advantages to using capacitive sensing in exemplary implementations of this invention. By using high-voltage amplifiers to probe proof mass position, sensitivity is increased because Q=CV or I=C dV/dt and V is large. This applies particularly to the differential displacement current measurement (with constant slope voltage) strategy. The step-response measurement also benefits in sensitivity from a large dV/dt. The synchronous detection method takes advantage of the ability to detect motion of the proof mass through a spatially-varying electric potential; its accuracy is limited primarily by timing accuracy in measuring the point at which the proof mass crosses between electrodes.

In a prototype of this invention, the proof mass is driven electrostatically. To do so in a compact space, a software-driven, multi-channel high-voltage signal generator is used. For example, such a high-voltage signal generator may be implemented according to the schematics set forth in FIGS. 7 and 8.

Figure 7:
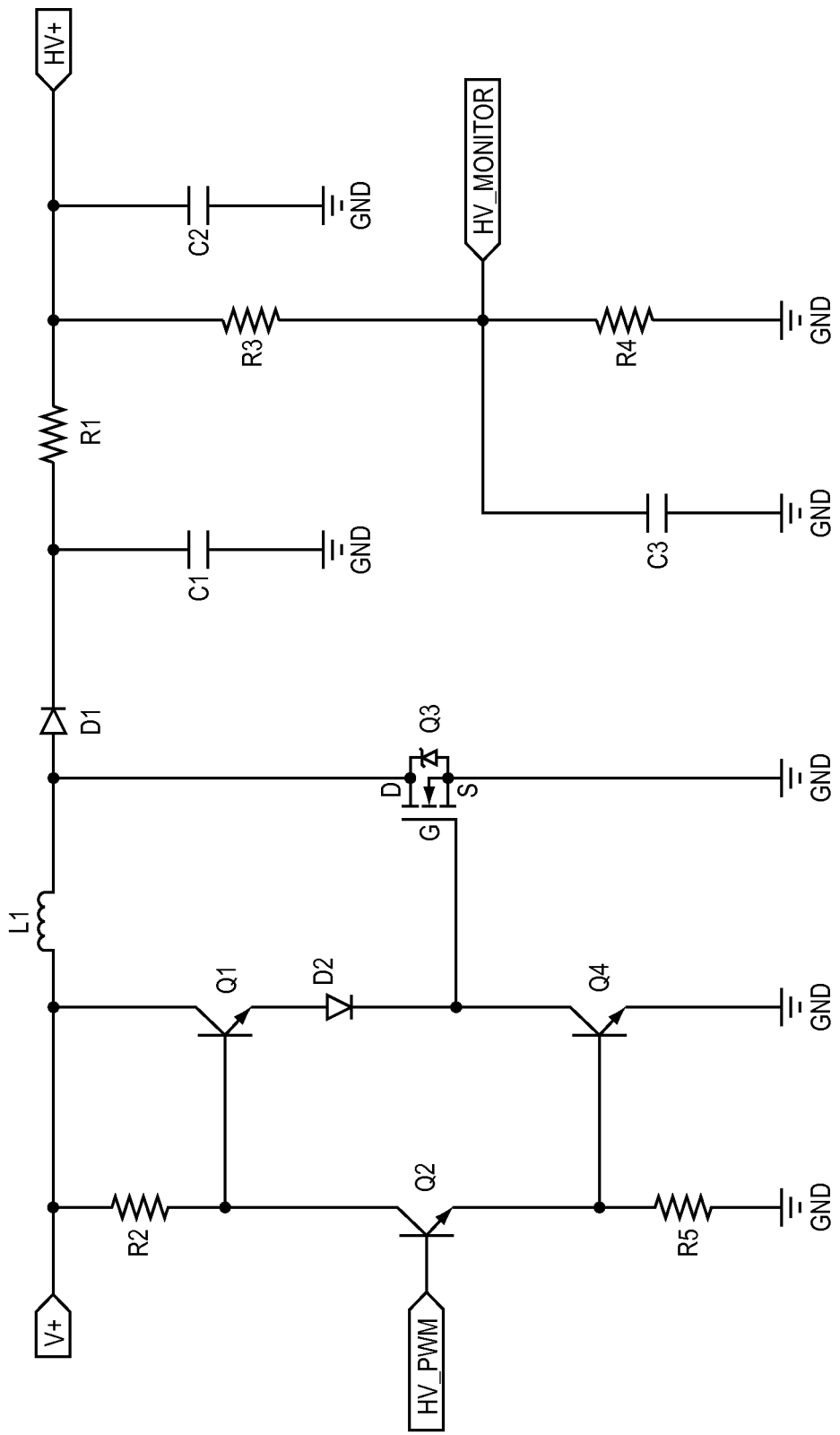
FIG. 7 is a schematic of a high voltage (HV) signal generator, in a prototype of this invention.

As illustrated in FIG. 7, a high-voltage supply is driven by a microcontroller providing a control signal [HV_PWM] and a low-voltage DC power supply in the range of 5V to 25V [V+]. The high-voltage output [HV+] is regulated by a control loop in the microcontroller, which uses the [HV_MONITOR] signal to continuously vary the control signal to provide a stable output voltage.

Figure 8:
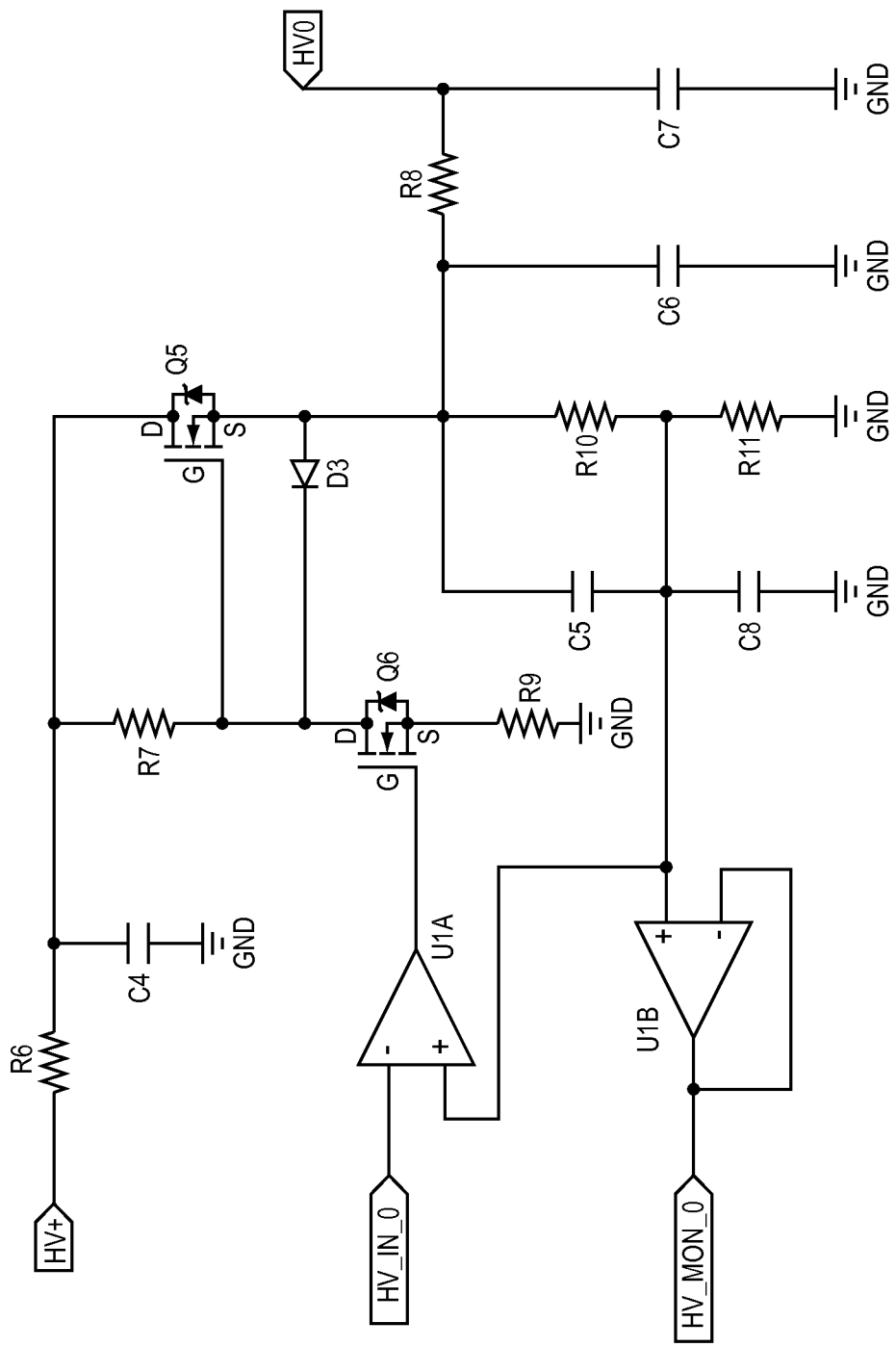
FIG. 8 is a schematic of electronics for measuring the capacitive coupling between a proof mass and a drive electrode, in a prototype of this invention.

FIG. 8 shows a compact high voltage amplifier with an output bandwidth of at least 1 kHz. The input signal [HV_IN_0] from the microcontroller varies from 0 to 5V and the high voltage rail is supplied on [HV+]. The output [HV0] is amplified by a factor of approx. 200 [(R10+R11)/R11] and may be monitored by the microcontroller on [HV_MON_0].

Figure 9:
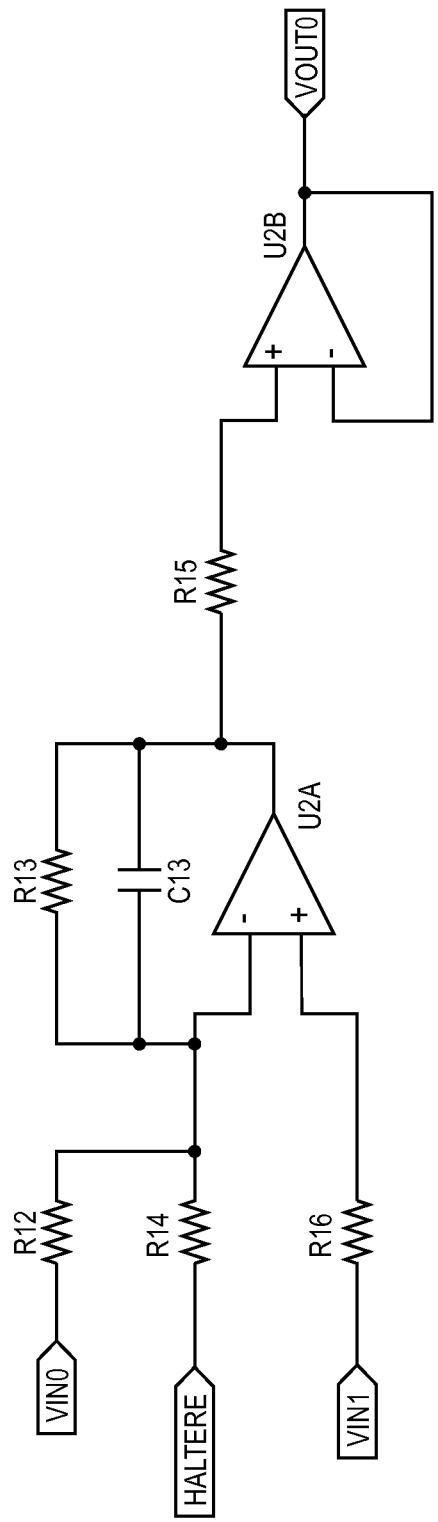
FIG. 9 depicts a pickup amplifier without active shielding, in a prototype of this invention.

FIG. 9 depicts a haltere pickup amplifier, in an exemplary implementation of this invention. This amplifier is connected directly to the haltere [HALTERE] and has bias points controlled by two input voltages [VIN0, VIN1] from the microcontroller. This pickup provides a readout [VOUT0] of the current flowing through the proof mass to the virtual ground at the negative op-amp input as the proof mass moves through the electric field in the trap. In one embodiment of this invention, proof mass position is measured by imposing a known electric field on the trap and integrating the output [VOUT0] to determine charge Q on the proof mass, which will be related to the electric potential V(r) at any given point in the field by the relation Q=CV, where C is the capacitance of the haltere.

Figure 10:
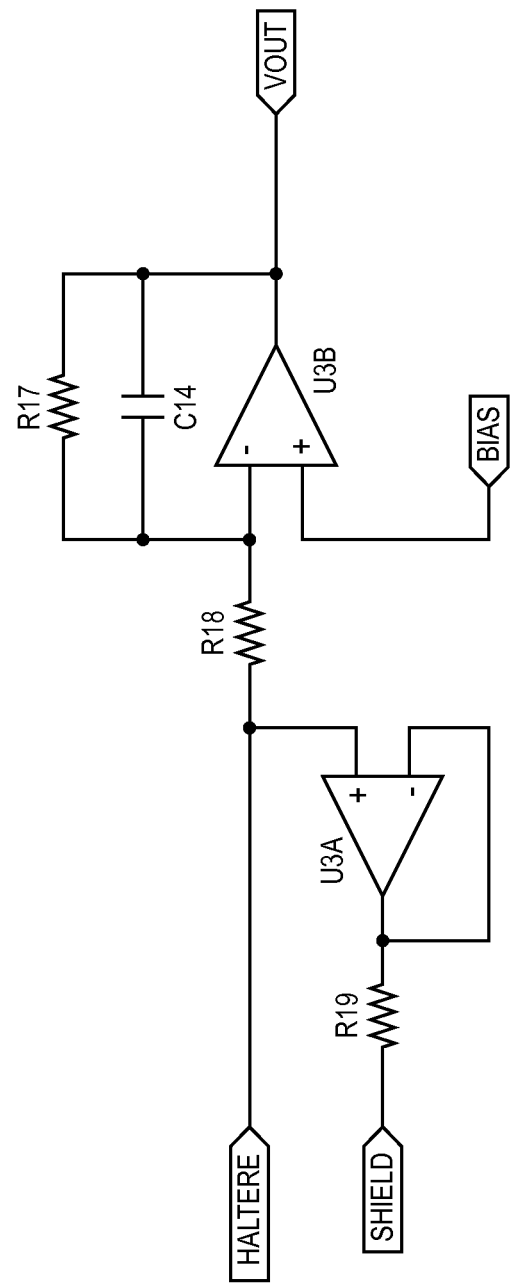
FIG. 10 depicts a pickup amplifier with active shielding, in a prototype of this invention.

FIG. 10 depicts an alternate embodiment of a haltere pickup amplifier which provides an actively-driven shield. In combination with the electrode structure depicted in FIG. 4, the haltere comprising proof mass 201 and cantilever 202 is electrically and mechanically connected to the electrode 205, which is electrically connected to the [HALTERE] signal of FIG. 10. The [SHIELD] signal of FIG. 10 is connected to electrode 206 to shield the haltere signal from electromagnetic interference and to minimize the effective capacitance of the electrical path from haltere to amplifier, both of which increase the measurement sensitivity.

Figure 11:
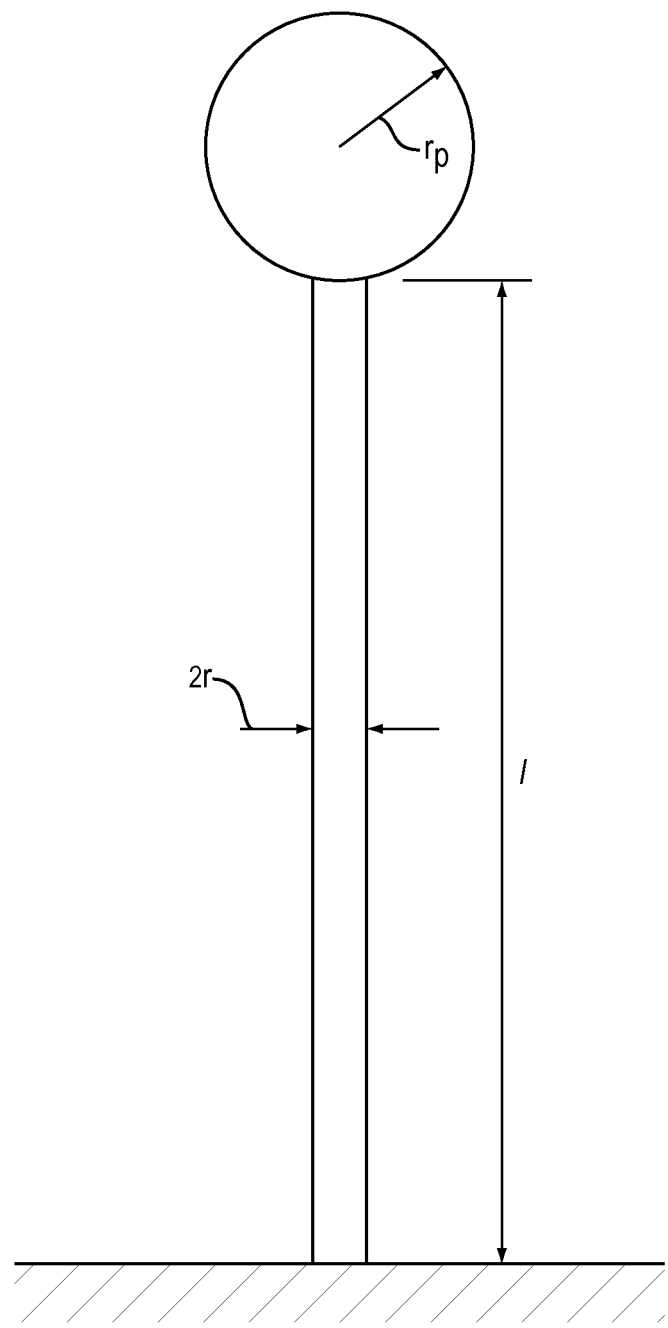
FIG. 11 is a diagram of proof mass geometry.

FIG. 11 is a diagram of a cantilevered proof mass. The cantilever may be modeled as a homogeneous circular beam of radius r, beam length l, and spherical proof mass radius $r_P$. The beam has an area moment of inertia $I_0$, where $$I_0 = \frac{\pi r^4}{4}.$$

The displacement δ of the beam at some distance z along its axis in response to a force F applied to the center of the proof mass is calculated to be:

$$\delta(z) = \frac{wz^2}{24EI}(6L^2 - 4Lz + z^2) + \frac{F}{6EI}g(z, z_1),$$

where the beam and proof mass have density ρ, the end of the beam is taken to be at the center of the spherical proof mass, and $w=\pi r^2 l \rho$, and $L=l+r_p$, and $z_1=l+r_p$.

Furthermore, $$\delta(L) \approx \frac{1}{E\pi r^4}\left[\frac{\pi r^2 l \rho}{2}L^4 + \frac{4F}{3}L^3\right].$$

The effective spring constant k is obtained from the displacement δ(L) of the end of a cantilever from its neutral axis by an applied force F, $$\delta(L) = \frac{4L^3}{3\pi E r^4}F \Rightarrow k = \frac{3\pi E r^4}{4L^3}$$

while the proof mass is $$m = \frac{4}{3}\pi \rho r_p^3.$$

In a prototype of this invention, a tethered proof mass has the following parameters:
l=1.5 mm
r=6 μm
$r_p$=75 μm
ρ=7800 kg·m$^{-3}$ (density of mild steel)
E=22×10$^{10}$ Pa (Young's modulus for mild steel)

From the above equations we find the resonant frequency of a prototype with these parameters by calculating the effective spring constant $$k = \frac{3\pi(22\times 10^{10} \text{ N}\cdot\text{m}^{-2})(6\times 10^{-6} \text{ m})^4}{4(1.575\times 10^{-3} \text{ m})^3} = 0.150 \text{ N}\cdot\text{m}^{-1}$$

and the proof mass $$m = \frac{4}{3}\pi(7800 \text{ kg}\cdot\text{m}^{-3})(75\times 10^{-6} \text{ m})^3 = 1.38\times 10^{-8} \text{ kg}$$

implying a resonant frequency of $$\omega_0 = \sqrt{\frac{k}{m}} = 562 \text{ Hz}$$

This is within 2.5% of the observed resonant frequency of 575 Hz which was measured for this prototype by exciting the tethered proof mass with an impulse (via electrostatic drive) and measuring its position (via capacitive pickup).

Figure 12:
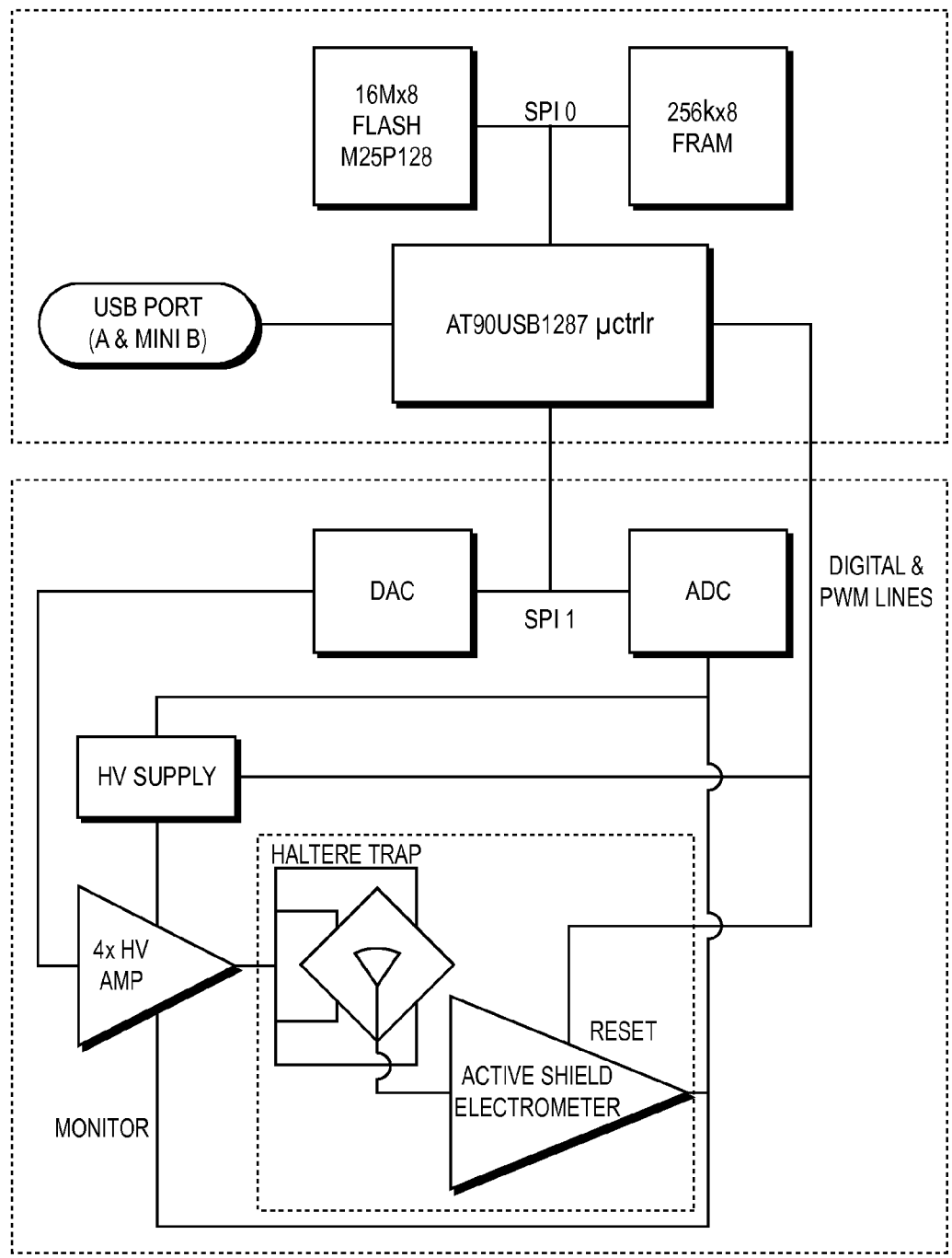
FIG. 12 is a block diagram of a prototype of this invention.

FIG. 12 is a block diagram of an embodiment of this invention, showing how certain hardware components interrelate. In this prototype, the hardware comprises:
- a USB interface for programming, control, and monitoring;
- battery power to allow disconnected operation and data collection (the battery power has the following specs: (A) minimum 1 hour runtime, (B) 3.6V Li-Poly rechargeable battery, (C) mixed-signal processing power budget 5V@10 mA=50 mW, (D) HV supply and amplifier power budget: 16V@200 mA=3.2 W, and (E) battery capacity: [1 hour*3.25 W]/(65% efficiency*3.6V)=1388 mA hour),
- fast memory for power/control diagnostic logging (Ramtron FM25V10 128k×8 ferroelectric RAM),
- slower memory for inertial data collection (Atmel AT45 DB642D 8M×8 serial FLASH with RAM block buffer),
- an electrostatic drive (4×12-bit DAC channels driving HV amplifiers),
- an 8-channel 12- or 16-bit ADC to monitor electrostatic drivers, HV supply, and electrometer(s), and
- an active shield electrometer to pick up field on haltere, with the following specs: high input impedance (>10 MΩ), low inherent capacitance (<5 pF), active shielding to decrease parasitic interconnect coupling of drive to cantilevered proof mass, and modularization to allow replacement of trap/electrometer assembly.

Proof mass motion need not be measured by capacitive sensors. Instead, this invention may be implemented with other types of motion sensors, such as optical or magnetic sensors.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. An inertial measurement unit, comprising a cantilevered proof mass, an electrostatic drive for putting the proof mass into a controlled trajectory, and a capacitive sensor for measuring the position and motion of the proof mass, wherein the inertial measurement unit is configured:
   (a) to measure lateral acceleration and rotation of the inertial measurement unit by measuring perturbations in the trajectory from a trajectory that the proof mass would travel in a fixed, non-rotating inertial frame;
   (b) to apply a first voltage $V1(t)=Vb1+m\,t$ to a first set of electrodes and a second voltage $V2(t)=Vb2-m\,t$ to a second set of electrodes, where m is a constant and the first and second voltages are changing at a constant rate; and
   (c) to measure a displacement current induced in the proof mass, which displacement current provides a signed measurement of spatial displacement of the proof mass.

2. The inertial measurement unit of claim 1, wherein the first and second sets of electrodes are each configured to be used alternately for electrostatic drive of the proof mass and for capacitive sensing.

3. The inertial measurement unit of claim 1, wherein:
   (a) a probe electrode is connected to the proof mass;
   (b) a shielding electrode is connected to ground or to a common reference, and
   (c) another electrode is positioned between the probe electrode and the shielding electrode and is configured to provide active shielding.

4. The inertial measurement unit of claim 1, wherein only one proof mass is included in the inertial measurement unit.

5. The inertial measurement unit of claim 1, wherein:
   (a) an elongated tether connects the proof mass to an electrode, which tether is not sufficiently rigid to support the weight of the proof mass; and
   (b) the inertial measurement unit is configured to apply a time-varying voltage to electrodes to electrodynamically suspend the proof mass.

6. The inertial measurement unit of claim 1, wherein the proof mass comprises a sphere and is attached to a cantilever beam.

7. The inertial measurement unit of claim 1, wherein the proof mass comprises a cylinder and is attached to a cantilever beam.

8. An inertial measurement unit, comprising a cantilevered proof mass, an electrostatic drive for putting the proof mass into a controlled trajectory, and a capacitive sensor for measuring the position and motion of the proof mass, wherein the inertial measurement unit is configured:
   (a) to measure lateral displacement and rotation of the inertial measurement unit by measuring perturbations in the trajectory from a trajectory that the proof mass would travel in a fixed, non-rotating inertial frame;
   (b) to create a spatially varying electric potential by applying a negative voltage to a first set of electrodes and a positive voltage to a second set of electrodes; and
   (c) to measure voltage on the proof mass to determine position of the proof mass.

9. The inertial measurement unit of claim 8, wherein the inertial measurement unit is configured to detect relative timing of positive currents and negative currents induced in the proof mass, in order to determine the lateral displacement and the rotation.

10. The inertial measurement unit of claim 8, wherein the first and second sets of electrodes are each configured to be used alternately for electrostatic drive of the proof mass and for sensing.

11. The inertial measurement unit of claim 8, wherein:
   (a) a probe electrode is connected to the proof mass;
   (b) a shielding electrode is connected to ground or to a common reference, and
   (c) another electrode is positioned between the probe electrode and the shielding electrode and is configured to provide active shielding.

12. The inertial measurement unit of claim 8, wherein only one proof mass is included in the inertial measurement unit.

13. The inertial measurement unit of claim 8, wherein:
   (a) an elongated tether connects the proof mass to an electrode, which tether is not sufficiently rigid to support the weight of the proof mass; and
   (b) the inertial measurement unit is configured to apply a time-varying voltage to electrodes to electrodynamically suspend the proof mass.

14. The inertial measurement unit of claim 8, wherein the proof mass comprises a sphere and is attached to a cantilever beam.

15. The inertial measurement unit of claim 8, wherein the proof mass comprises a cylinder and is attached to a cantilever beam.

* * * * *